(12) United States Patent
Luiggi

(10) Patent No.: US 8,113,423 B2
(45) Date of Patent: Feb. 14, 2012

(54) STORE FOR SPARE PARTS AND METHOD FOR ALLOCATING KITS OF SPARE PARTS

(75) Inventor: Pierre-Noel Luiggi, Paris (FR)

(73) Assignee: Oscaro Com, Paris (FR)

( * ) Notice: Subject to any disclaimer, the term of this patent is extended or adjusted under 35 U.S.C. 154(b) by 319 days.

(21) Appl. No.: 12/392,790

(22) Filed: Feb. 25, 2009

(65) Prior Publication Data

US 2009/0218399 A1    Sep. 3, 2009

(51) Int. Cl.
| | |
|---|---|
| *G06Q 10/00* | (2006.01) |
| *G06Q 30/00* | (2006.01) |
| *G06Q 90/00* | (2006.01) |
| *A01K 5/02* | (2006.01) |
| *G06F 17/50* | (2006.01) |
| *G06F 19/00* | (2011.01) |
| *G06K 15/00* | (2006.01) |
| *B42D 15/00* | (2006.01) |

(52) U.S. Cl. ............ 235/385; 705/28; 705/29; 235/383; 283/55

(58) Field of Classification Search .................. 235/383, 235/385; 705/28, 29; 283/55
See application file for complete search history.

(56) References Cited

U.S. PATENT DOCUMENTS

| | | | | |
|---|---|---|---|---|
| 3,881,633 A | * | 5/1975 | Bradt | 221/123 |
| 3,964,613 A | * | 6/1976 | Anderson, Jr. | 211/64 |
| 4,007,843 A | * | 2/1977 | Lubbers et al. | 414/273 |
| 4,174,036 A | * | 11/1979 | Beckman et al. | 206/223 |
| 4,678,390 A | * | 7/1987 | Bonneton et al. | 414/282 |
| 4,911,296 A | * | 3/1990 | Hart, Jr. | 206/373 |
| 5,379,887 A | * | 1/1995 | Conley, Jr. | 206/232 |
| 6,164,215 A | * | 12/2000 | Cook et al. | 108/60 |
| 6,253,954 B1 | * | 7/2001 | Yasaka | 221/93 |
| 6,260,700 B1 | * | 7/2001 | Huang | 206/373 |
| 6,669,214 B1 | * | 12/2003 | Domis | 280/47.35 |
| 7,219,834 B2 | * | 5/2007 | Chang | 235/380 |
| 7,318,008 B2 | * | 1/2008 | Hagen | 702/184 |
| 2003/0055753 A1 | * | 3/2003 | Dellar et al. | 705/29 |
| 2003/0218307 A1 | * | 11/2003 | Anderson et al. | 280/79.2 |
| 2005/0060327 A1 | * | 3/2005 | Kawahara et al. | 707/100 |
| 2005/0244169 A1 | * | 11/2005 | Ono | 399/12 |
| 2006/0091207 A1 | * | 5/2006 | Chang | 235/385 |
| 2006/0167711 A1 | * | 7/2006 | Chakraborty et al. | 705/1 |
| 2006/0167760 A1 | * | 7/2006 | Chakraborty et al. | 705/26 |
| 2006/0190342 A1 | * | 8/2006 | Dendl et al. | 705/26 |
| 2007/0103039 A1 | * | 5/2007 | Holcomb et al. | 312/107 |
| 2007/0156543 A1 | * | 7/2007 | Klim et al. | 705/28 |
| 2007/0203857 A1 | * | 8/2007 | Hagen | 705/400 |
| 2007/0210024 A1 | * | 9/2007 | Haake | 211/149 |
| 2007/0255444 A1 | * | 11/2007 | Kauffman et al. | 700/117 |
| 2008/0296373 A1 | * | 12/2008 | Zmood et al. | 235/385 |
| 2009/0045708 A1 | * | 2/2009 | Dominique | 312/301 |
| 2009/0256454 A1 | * | 10/2009 | Landau et al. | 312/249.11 |
| 2010/0017267 A1 | * | 1/2010 | Negron | 705/10 |

FOREIGN PATENT DOCUMENTS

| | | |
|---|---|---|
| DE | 3733845 A1 | 5/1989 |
| DE | 10010494 A1 | 9/2001 |
| DE | 10200077 A1 | 12/2002 |

OTHER PUBLICATIONS

International Search Report—FR 0801096.
Written Opinion—FR 0801096.
Priority Document—FR 0801096.

* cited by examiner

*Primary Examiner* — Daniel Walsh

(74) *Attorney, Agent, or Firm* — Howard M. Gitten; Edwards Wildman Palmer LLP

(57) ABSTRACT

Said store for spare parts comprises a plurality of compartments which each contain a kit of spare parts and a plurality of kits are each composed of different types of spare parts. Application to the automotive industry.

1 Claim, No Drawings

STORE FOR SPARE PARTS AND METHOD FOR ALLOCATING KITS OF SPARE PARTS

CROSS-REFERENCE TO RELATED APPLICATIONS

This application claims priority to French Patent Application Serial No. FR0801096 filed Feb. 28, 2008.

BACKGROUND OF THE INVENTION

The present invention relates to stores for spare parts and to the methods for allocating kits of spare parts. It relates, in particular, to the field of the automotive industry but also to any other industrial field in which vehicles or machines require different spare parts for their repair.

In a store for spare parts, each type of spare part is specifically stored in a compartment. This is, therefore, the case, for example in US 2003/055753, in which, in paragraph 60, it is mentioned that a kit consists of a container, i.e., a compartment. The kits, i.e. the containers or compartments, contain a set of parts. They may also contain consumables. As spare parts, it is apparent that the compartment, on the one hand, contains only one kit of the same parts and, on the other hand, the compartment or kit, which is considered to be equivalent, is permanently allocated to one machine.

BRIEF SUMMARY OF THE INVENTION

The invention completely departs from this method. According to the invention, a plurality of compartments each contain a kit of spare parts and a plurality of kits are each composed of different types of spare parts.

A spare part of the same type may, therefore, be found in a very large number of compartments associated with other spare parts of a different type. This apparent disorder corresponds to a predetermined order, the spare parts being grouped together in kits and each kit being placed in a compartment so that the compartment corresponds to the intended user, whether it is the mechanic who has placed the order or the vehicle which requires a variety of spare parts including a plurality of parts of different types.

This manner of classifying the spare parts makes it possible to gain a considerable amount of time since the kits, which in any case would have had to have been subsequently made up if the spare parts had been classified in a conventional manner, i.e. spare parts of the same type in one compartment, are now made up immediately, with the possibility of being informed, for example by computer, that a kit is complete and that it may be removed from the compartment and sent to the intended user.

At any given moment, the store is as defined above, it being understood that the compartments are progressively emptied and refilled with different kits intended for different intended users, it being understood that sometimes the same compartment may be allocated several times in succession to the same intended user. However, in general, each compartment changes its intended user.

The types of parts may differ by the nature, the dimensions, the color and/or the origin (manufacturer) of the spare parts.

A plurality of compartments respectively contain at any given moment a plurality of differently composed kits. One compartment is not permanently allocated to the same intended user.

The compartments are grouped together in rows and numbers are allocated to all the kits contained in the same row, one part of each of these numbers being the same for all the kits of the same row. The part is, in particular, made up of the last digit or the last digits of the number. Thus a number may be allocated to each kit and depending, for example, on the last digit of the number, the kit may be arranged in the corresponding row so that the empty compartments are, according to the law of probability, uniformly distributed between the rows which facilitates the management of the store, both when it is necessary to put a new kit in an empty compartment and when it is necessary to find the complete kit to be removed and to which a number has been allocated. Preferably, each row has the same number of compartments. It is also advantageous that each compartment in a row is accessible independently of the other compartments in the row, so that it is possible to place the kits in a compartment of the row and to remove them without having to handle or disturb the other kits in the row. To this end, the compartments are accessible from the top or from their front face.

Preferably, compartments of the same row are separated from one another by removable separating elements. Said separating elements may be partitions, but also a single bar making the distinction between two consecutive kits. When a kit is very bulky, it may also be placed in two consecutive compartments in the same row which, during the time when this kit is made up, then become a single compartment.

The subject of the invention is also a method for allocating kits of spare parts, which are at least partially different from one another, to respective intended users in which each kit is identified by a number and in the store the same row of storage compartments is allocated to the kits, one part of the digits making up the number thereof being the same, the parts of the kit are placed in the compartment which corresponds thereto as they arrive in the store, the kit is removed from the compartment when the kit is complete and the kit is sent to the intended user and the compartment refilled with a kit which is different from that which it had before removal.

DETAILED DESCRIPTION OF THE INVENTION

A store for spare parts has ten row, each consisting of seven compartments. The composition of the kits in the first row and in the second row are illustrated.

In the first compartment of the first row, at a given moment there are two wheel rims and an indicator lamp. The kit will be completed when a floor mat is added. Subsequently, this floor mat will be put in place and the kit removed from this compartment. This compartment will become empty. It could receive a further kit, the number thereof being terminated by 1. The kit which was until now in this compartment also had a number which was terminated by 1. Compartment number two comprises a tyre of a specific brand and a blue rear view mirror. The compartment requires an indicator lamp to be complete. The third compartment of the first row is empty. It is ready to receive a new kit. The fourth compartment comprises a transmission belt and a window winding mechanism. The compartment requires two rear lamps to be complete. The same applies to all the other compartments of the row, the kits thereof being of different compositions and the composition of the kits varying over time. All the kits of this row have a number which is terminated by 1, whilst all the kits of the second row have a number which is terminated by 2 and the same applies to the other rows, the last row having kits, the number thereof being terminated by zero.

What is claimed as new and desired to be protected by Letters Patent of the United States is:

1. A method for managing kits of spare parts, wherein the kits are comprised of different parts from each other, to respective intended users characterized in that each kit is identified by a number of digits comprising the steps of:

separately collecting the parts of a kit at different respective periods over time placing the parts of each of the kits in a respective compartment corresponding to the order in which the parts arrive in a storage device until a kit is complete, wherein the storage device comprises a plurality of compartments in rows;

allocating the same row of storage compartments to the kits such that one part of the digits making up the number is the same for all the kits in the row;

providing a computer, the computer determining when a kit is complete as function of the allocation, and indicating that a kit may be removed from the compartment;

removing the kit from the compartment when the kit is complete;

sending the kit to the intended user; and refilling the compartment with a kit that is comprised of different types of parts from the kit that was removed.

* * * * *